(12) United States Patent
Cooper (10) Patent No.: US 10,839,967 B2
(45) Date of Patent: Nov. 17, 2020

(54) CONVECTIVE DRY FILTERED CONTAINMENT VENTING SYSTEM

(71) Applicant: Framatome Inc., Lynchburg, VA (US)

(72) Inventor: William Henry Cooper, Pickering (CA)

(73) Assignee: Framatome Inc., Lynchburg, VA (US)

( * ) Notice: Subject to any disclaimer, the term of this patent is extended or adjusted under 35 U.S.C. 154(b) by 557 days.

(21) Appl. No.: 15/326,493

(22) PCT Filed: Jul. 14, 2015

(86) PCT No.: PCT/US2015/040413
§ 371 (c)(1),
(2) Date: Jan. 15, 2017

(87) PCT Pub. No.: WO2016/011055
PCT Pub. Date: Jan. 21, 2016

(65) Prior Publication Data
US 2017/0206986 A1    Jul. 20, 2017

Related U.S. Application Data

(60) Provisional application No. 62/024,348, filed on Jul. 14, 2014.

(51) Int. Cl.
*G21C 13/02* (2006.01)
*G21C 9/004* (2006.01)
*G21F 9/02* (2006.01)

(52) U.S. Cl.
CPC ........... *G21C 13/022* (2013.01); *G21C 9/004* (2013.01); *G21F 9/02* (2013.01); *Y02E 30/30* (2013.01)

(58) Field of Classification Search
CPC ......... G21C 9/004; G21C 13/022; G21F 9/02; B01D 2257/20; B01D 2257/2068; B01D 39/10; B01D 39/12; B01D 46/4263
See application file for complete search history.

(56) References Cited

U.S. PATENT DOCUMENTS 2,792,074 A  *  5/1957  Schilb .................... B01D 46/04
                                                96/372
4,859,405 A      8/1989  Squarer et al.
(Continued)

FOREIGN PATENT DOCUMENTS

DE        38 15 850 A1      8/1989
DE        102012211897      9/2012
JP        H06 207999 A      7/1994

OTHER PUBLICATIONS

The International Search Report and the Written Opinion of the International Searching Authority for corresponding PCT/US2015/040413.

(Continued)

*Primary Examiner* — Sharon M Davis
(74) *Attorney, Agent, or Firm* — Davidson, Davidson & Kappel, LLC (57) ABSTRACT

A dry FCVS for a nuclear reactor containment is provided. The dry FCVS includes a housing and a round and/or elongated aerosol filter inside the housing for removing contaminant aerosols from gas passing through the housing during venting of the containment. The housing includes at least one inlet portion configured for directing gas into the aerosol filter during the venting of the containment and an outlet portion for gas filtered by the aerosol filter during the venting of the containment. The dry filtered containment venting system is arranged and configured such that when a flow of gas through the outlet portion is closed off at least one of convective, radiant and conductive heat transfer removes decay heat of aerosols captured in the aerosol filter.

19 Claims, 10 Drawing Sheets

(56) References Cited

U.S. PATENT DOCUMENTS

| | | | |
|---|---|---|---|
| 5,013,341 A * | 5/1991 | Isaksson | B01D 46/0068 55/302 |
| 5,318,606 A * | 6/1994 | Geibel | B01D 46/24 55/309.1 |
| 2012/0051488 A1 | 3/2012 | Eckardt et al. | |
| 2014/0007550 A1 | 1/2014 | Martinsteg | |
| 2015/0243379 A1 | 8/2015 | Buhlmann et al. | |

OTHER PUBLICATIONS

European Search Report for corresponding patent application EP18177528.

\* cited by examiner

CONVECTIVE DRY FILTERED CONTAINMENT VENTING SYSTEM

This claims the benefit to U.S. Provisional Patent Application No. 62/024,348, filed on Jul. 14, 2014, which is hereby incorporated by reference herein.

The present disclosure relates generally to a filtered containment venting system, and more specifically to a dry filtered containment venting system including metal fiber filters and molecular sieves.

BACKGROUND

In the unlikely and hypothetical situation of a beyond design basis event or a severe accident at a nuclear plant, the pressure within the nuclear reactor containment building could build up causing a potential for leakage or even containment failure. A filtered containment venting system (FCVS) allows for the release of the over-pressure while retaining fission products.

FCVSs historically have been provided in two general categories—wet and dry. A wet FCVS uses a water solution as the primary method of capturing radioactivity. With a dry FCVS, no water is required to capture radioactivity. Dry FCVSs have a more simple design and have less pressure drop than wet FCVSs. However, dry FCVSs historically have issues with decay heat limitations and plugging potential.

SUMMARY OF THE INVENTION

A dry FCVS for a nuclear reactor containment is provided. The dry FCVS includes a housing and a round and/or elongated aerosol filter inside the housing for removing contaminant aerosols from gas passing through the housing during venting of the containment. The housing includes at least one inlet portion configured for directing gas into the aerosol filter during the venting of the containment and an outlet portion for gas filtered by the aerosol filter during the venting of the containment. The dry filtered containment venting system may be arranged and configured such that when a flow of gas through the outlet portion is closed off at least one of convective, radiant and conductive heat transfer removes decay heat of aerosols captured in the aerosol filter.

The FCVS according to one aspect of the invention, to be used outside containment, may include an inlet portion and an outlet portion. The inlet portion includes a tube or pipe that expands into a bowl-like structure with a tubesheet opposite the inlet pipe. The outlet portion has a similar design. The tubesheet can have an internal chimney to allow for better heat removal. Alternatively, headers could be used in place of the tubesheets. A number of tubes extend between the inlet and outlet tubesheets/headers. Each of these pressure tubes may include an aerosol filter, preferably a metal fiber filter (MFF), and an iodine filter, preferably a molecular sieve (MS). The pressure tubes are positioned in a spaced arrangement, allowing air flow therebetween. This allows for radiant, conductive and/or convective heat transfer to remove decay heat and prevent the MFF and MS from reaching unsafe temperatures. Additionally, an air gap may be provided between the outside of the filter and the interior surface of the pressure tube. The air gap is sized to ensure optimal heat transfer is achieved, while being large enough to ensure that the process flow going into the filter is not sub-cooled. In addition to being to the air gap being equal to one third of the MFF diameter, the present design is such that the area of the hot surface (discharging heat) is less than the area of the cold surface (receiving heat).

The FCVS according to another aspect of the invention, to be used inside containment, may include an aerosol filter for removing contaminants from gas passing therethrough during venting of the containment, a lower inlet portion for directing gas upward into a lower section of the aerosol filter during the venting of the containment, an upper inlet portion for directing gas downward into an upper section of the aerosol filter during the venting of the containment and an outlet portion for gas filtered by the aerosol filter during the venting of the containment. The lower inlet portion and the upper inlet portion is arranged such gas flows in through the lower inlet portion upward through the lower and upper sections of the aerosol filter and out through the upper inlet portion when a flow of gas through the outlet portion is closed off so as to allow a forced convective cooling of the decay heat of aerosols captured in the aerosol filter, via a chimney effect.

BRIEF DESCRIPTION OF THE DRAWINGS

The present invention is described below by reference to the following drawings, in which:

FIG. 6c shows a cross-sectional view at A-A in FIG. 6a; and

DETAILED DESCRIPTION

Some embodiments of the present invention are directed to a dry FCVS having a pressure tube design. Typical dry FCVSs reach elevated temperatures due to the collected radioactivity, which creates heat called "decay heat." This decay heat can elevate the filter surface temperature to 270° C. or more, which is greater than the melting temperature of CsOH, an aerosol that is produced during severe accidents. As a result, the melted aerosol can coat the filter and block the flow (called filter cake melting). Additionally, the temperatures that can be reached by typical dry FCVSs are as high as 550° C., well above the hydrogen auto-ignition temperature, which could result in a fire or detonation.

Furthermore, typical dry FCVS designs place the cooling pipes in the flow of the exiting gas. This can sub-cool the gas, making it wet, and compromising the filter and molecular sieve efficiencies.

Another concern with typical dry FCVSs is that there is no way to clean the filters in place. Thus, these known FCVSs have limits to aerosol loading.

Embodiments of present invention may provide improved dry FCVSs that are not subject to one or more of these shortcomings. In some embodiments, the FCVS includes a pressure tube design, which may remove heat more effectively. Furthermore, the embodiments of the pressure tube design may not cool within the flow path, so the filter efficiency is not compromised. Additionally, passive pressure pulsing can be added to the MFFs, which can keep them from plugging and allow for operation into molten concrete-corium interaction where dust loading can be very high. In another embodiment, the FCVS includes a chimney design to convectively remove decay heat when the FCVS is not venting.

Figure 1:
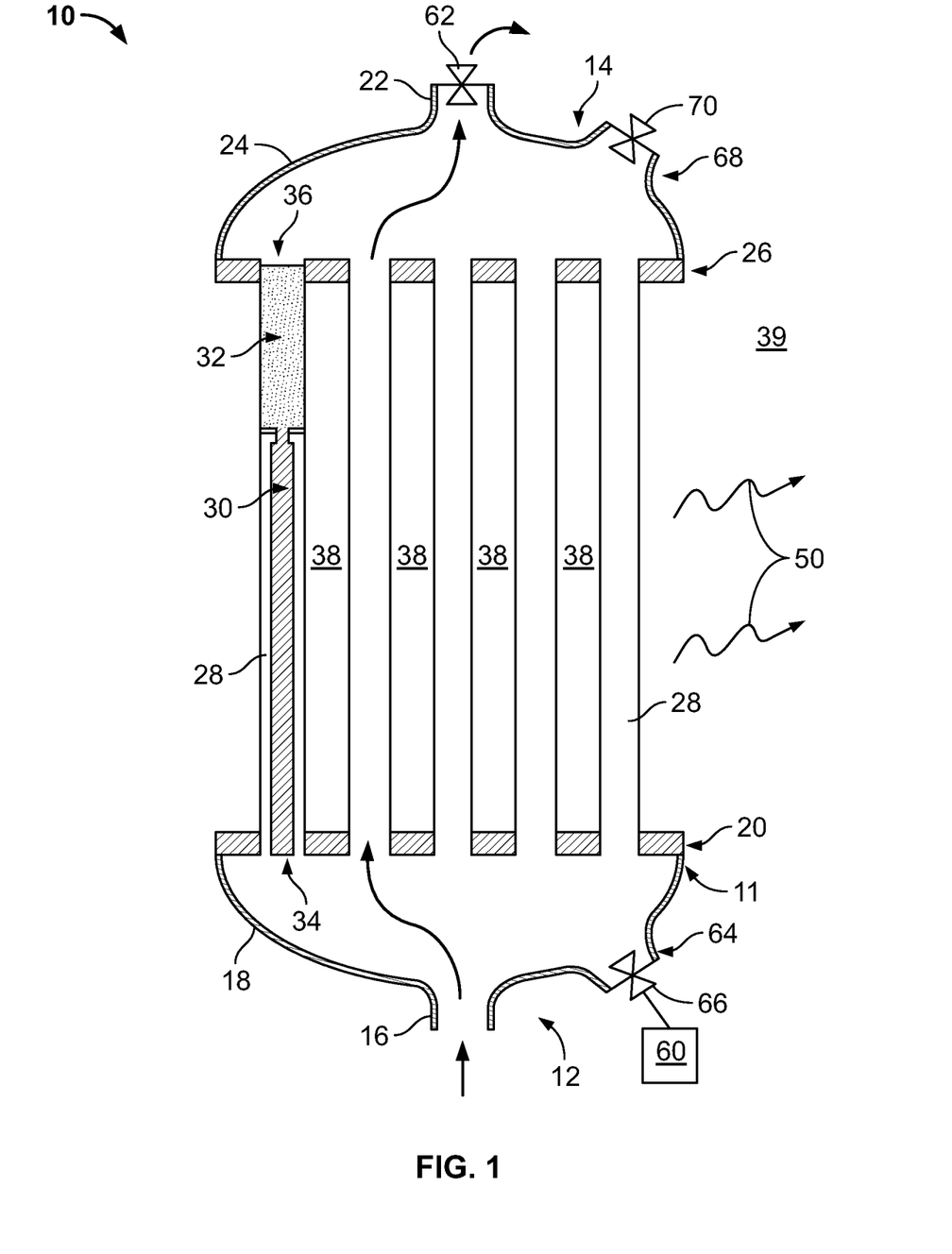
FIG. 1 shows a cross-sectional view of a dry FCVS in accordance with an embodiment of the present invention.

FIG. 1 shows a cross-sectional view of a dry FCVS 10 in accordance with an embodiment of the present invention. FCVS 10 includes a housing 11 having an inlet portion 12, an outlet portion 14 and pressure tubes 28. Inlet portion 10 includes an inlet tube or pipe 16 that expands into a bowl-shaped manifold 18 holding a tubesheet 20 opposite inlet pipe 16. Outlet portion 14 has a similar design, including an outlet tube or pipe 22 that expands into a bowl-shaped manifold 24 holding a tubesheet 26 opposite outlet pipe 22. A number of pressure tubes 28 extend between inlet and outlet tubesheets 20, 26 and together define a cylindrical shape that is axially sandwiched between tubesheets 20, 26. Each of these pressure tubes 28 houses a round elongated aerosol filter in the form of a cylindrical MFF 30 and an iodine filter in the form of a MS 32. In preferred embodiments, MFF 30 is positioned on an inlet side 34 of each pressure tube 28 and MS 32 is positioned on an outlet side 36 of each pressure tube 28. Pressure tubes 28 are positioned in a spaced arrangement, allowing spaces 38 for air flow therebetween and convective heat transfer with ambient air 39. The spaced arrangement allows for radiant and convective heat transfer to remove decay heat 50 and prevent MFF 30 and MS 32 from reaching unsafe temperatures.

FCVS 10 also includes a schematically shown air source 60 for providing air to remove decay heat from MFF 30 when a flow of gas through outlet portion 14 is closed off, for example via a controllable valve 62 provided in outlet pipe 22. The air source 60 provides convective air flow through pressure tubes 28 to remove the decay heat of radioactive aerosols captured in MFF 30. Air source 60 may be connected to a cooling inlet port 64, which may be opened and closed by a controllable valve 66, formed in inlet portion 12 at manifold 18. Outlet portion 14 may also include a cooling outlet port 68, which may be opened and closed by a controllable valve 70, provided at manifold 24. When the outlet of pipe 22 is closed by valve 62, ports 64, 68 may be opened by respective valves 66, 70 such that cooling air from air source 60 flows into inlet portion 12, through pressure tubes 28 and out of outlet portion 14 via cooling outlet port 68.

FCVS 10 is arranged and configured such that when a flow of gas through outlet portion 14 is closed off convective, radiant and conductive heat transfer removes decay heat of aerosols captured in MFFs 30. Convective heat transfer occurs via the outer surface of pressure tubes 28 and the surrounding air, radiant heat transfer occurs between MFFs 30 and pressure tubes 28 and conductive heat transfer occurs by conducting decay heat from MFFs 30 to pressure tubes 28. For the radiant heat transfer, in contrast to conventional systems, the cold surface area of each of pressure tubes 28, formed by the inner surface of the pressure tube 28, is greater that the hot surface area of each of pressure tubes 28, formed by the outer surface of the MFF 30, such that decay heat radiates from MFF 30 to pressure tubes 28. In other words, the design of FCVS 10 is such that relative surface area of the cold to hot surfaces for heat transfer is greater than 1. The other pressure tube embodiments—FCVSs 110, 210, 310—may be similarly designed.

Figure 2A:
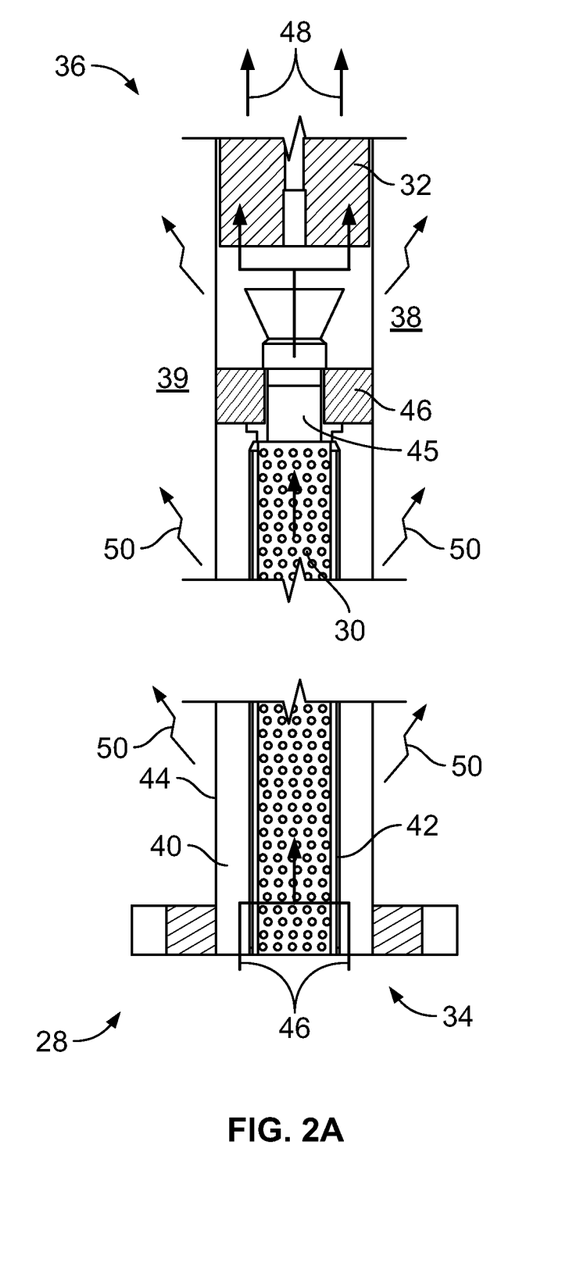
FIGS. 2a to 2d illustrate more detailed views of the pressure tubes shown in FIG. 1.
Figure 2B:
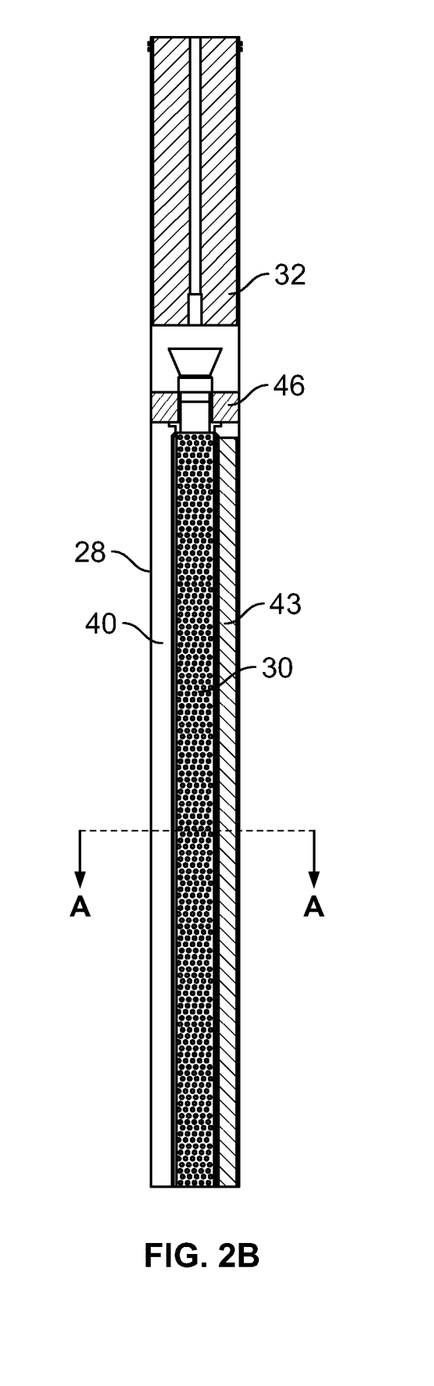
Figure 2C:
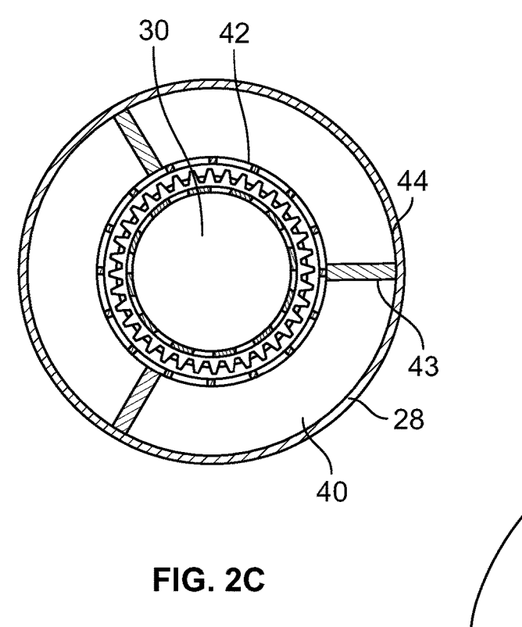
Figure 2D:
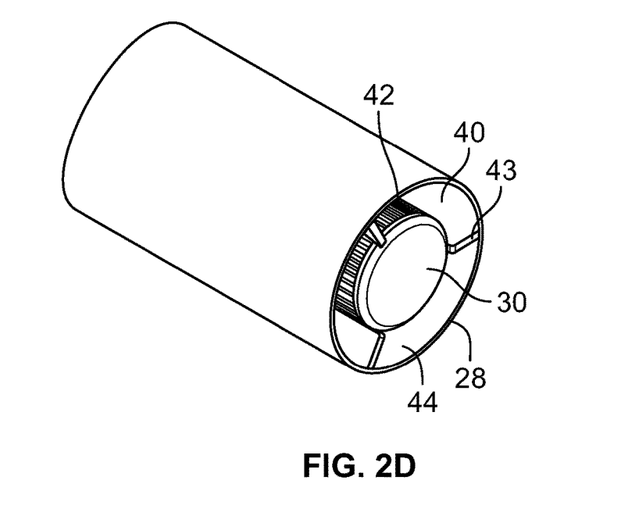

FIGS. 2a to 2d illustrate more detailed views of pressure tubes 28 shown in FIG. 1. FIG. 2a shows an enlarged view of a cross-section of one of pressure tubes 28 shown in FIG. 1 illustrated a gas flow therethrough, FIG. 2b shows a view of pressure tube 28 along the same cross-section as in FIG. 2a, FIG. 2c shows a cross-sectional view of pressure tube 28 along A-A in FIG. 2b and FIG. 2d shows a perspective view of inlet side 34 of pressure tube 28. Air gaps 40 may be provided between an outer surface 42 of MFF 30 and an inner surface 44 of pressure tube 28. Air gaps 40 are delimited circumferentially between spacers 43, which extend radially between outer surface 42 of MFF 30 and inner surface 44 of pressure tube 28, and are sized to ensure additional conductive heat transfer is achieved, while being not too large to ensure that the process flow going into MFF 30 is not sub-cooled. Spacers 43 may be formed of metal for conductive heat transfer by conducting decay heat from MMFs 30 to pressure tubes 28. As schematically shown in FIG. 2a, contaminated inlet gas 46 may enter inlet side 34 of pressure tube 28, enter air gaps 40 and pass radially into MFF 30 for aerosol filtering. The aerosol filtered gas exiting MFF 30 then passes through a hole 45 in a barrier 46 separating MFF 30 and MS 32, then enters MS 32 for iodine filtering. The aerosol filtered and iodine filtered outlet gas 48 then exits MS 32 and outlet side 36 of pressure tube 28 to enter into manifold 24 for merging with aerosol filtered and iodine filtered outlet gas leaving other tubes 48. The aerosol filtered and iodine filtered outlet gas 48 next exits outlet pipe 22 and is released outside of the nuclear reactor containment. As schematically shown in FIG. 2a, decay heat 50 is released to spaces 38 and ambient air 39 for convective heat transfer.

MFF 30 captures fission products that would otherwise be vented outside of the containment building. MFF 30 may be formed of stainless steel sintered metal fibers. In one preferred embodiment, MFFs 30 are commercially available cartridges, lowering cost and allowing for easy installation and removal. For example, SINTERFLO sintered stainless steel filter cartridges from Porvair Filtration Group may be used. Alternative materials for the cartridge-type filters may also be utilized.

MS 32 may be a cartridge filled with a media that absorbs iodine. For example, the media may be a zeolite coated with silver. The silver reacts with the iodine present in the vent gasses to capture the iodine and prevent it from being exhausted outside the containment building. The use of commercially available sieve media allows for a lower cost for the filtering hardware. If iodine capture is not required by an end user, the molecular sieve portion may be eliminated.

By using multiple MFF 30/MS 32 sets, each in a respective pressure tube 28, each individual MFF 30/MS 32 set has its own pressure boundary, delimited by pressure tube 28, that is exposed to the ambient air. In this way the heat transfer to address decay heat does not have to pass across to the inside of a pressure vessel (with less ratio of surface area), as with conventional dry FCVS designs. Pressure tubes 28 each have sufficient surface area to expel the required heat. By providing several relatively smaller tubes, pressure tubes 28 are advantageously thin and still able to handle the same pressure as an equivalent thicker pressure vessel. Pressure tubes 28 can be sized based on plant configuration and to accommodate the desired heat transfer. A preferred inner diameter size for pressure tubes 28 is approximately 2 inches to approximately 10 inches, with a nominal inner diameter of 4 inches being more preferred.

The wall thickness of pressure tube 28 is a function of diameter and pressure. With the 4 inch nominal inner diameter, 1/16 inch would be a preferred nominal wall thickness.

FCVS 10 may allow for higher pressure operation than other dry systems that use HVAC-type enclosures. A typical HVAC FCVS uses a square casing and has an orifice plate before the system that drops the pressure to atmospheric, requiring a larger filter area since the steam/air mixture has expanded in volume. The small diameter pressure tubes 28 of the pressure tube FCVS 10 can be thin and still be able to handle the pressure, which is spread across the plurality of pressure tubes 28. Furthermore, in event of a hydrogen burn pressure spike, FCVS 10 may easily handle the pressure spike whereas an HVAC-type enclosure may fail.

The integral MFF 30 and MS 32 in each pressure tube 28 eliminates the need for two separate vessels/enclosures— one for the MFF and another for the MS—of other dry FCVS designs.

The pressure tube design of FCVS 10 allows for passive decay heat removal including the high decay heat load of multi-unit power plants. Decay heat is from radioactive decay of captured aerosols and iodine. Each MFF 30 is close to the respective pressure tube 28, and the pressure tube 28 is indirect communication with the ambient environment, so the path for heat transfer is short. With the pressure vessel design of known dry FCVSs, the heat must make it all the way to the pressure vessel surface and there is limited surface area. For known HVAC-type designs, the required enclosure is large with relatively little effective surface area, while cooling tubes are positioned within the process flow, which can sub-cool the flow.

Thus, FCVS 10 is completely passive with no requirement to add water or chemicals. Plugging potential is significantly reduced by the increased surface area of the MFFs 10 and potential use of pressure pulse technology. The decay heat removal capability keeps the temperature below the auto-ignite temperature of hydrogen and also below the melting point of hydroscopic aerosols. The air gap and geometry are designed to ensure that during normal operation the heat loss does not impact performance, but during idle venting periods, the heat built up from decay heat can be released via a combination of radiant heat due to the higher temperature as well as natural convection cells created in the stagnant tubes (that is, pressure tubes that are not being used during an idle period), as well as conductively removed through spacers 43.

The relatively small size of pressure tubes 28 allows for the possibility of cleaning MFFs 30 and MSs 32 in place. A nitrogen bottle system can be added to back purge pressure tubes 28 with a pressure pulse for less than 0.5 second to reverse clean the filter.

Figure 3:
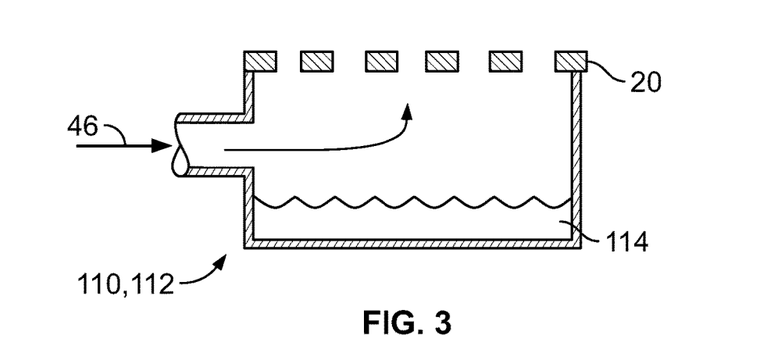
FIG. 3 shows a partial cross-sectional view of an inlet portion of a dry FCVS according to another embodiment of the present invention.

FIG. 3 shows a partial cross-sectional view of an inlet portion 112 of a dry FCVS 110 according to another embodiment of the present invention. FCVS 110 may be configured in the same manner as FCVS 10 downstream of tubesheet 20. Inlet portion 112 includes a sump 114 for collecting aerosols from the pressure pulse backwashing process, which occurs by pulsing gas into the outlet side of each pressure tube 28.

Figure 4A:
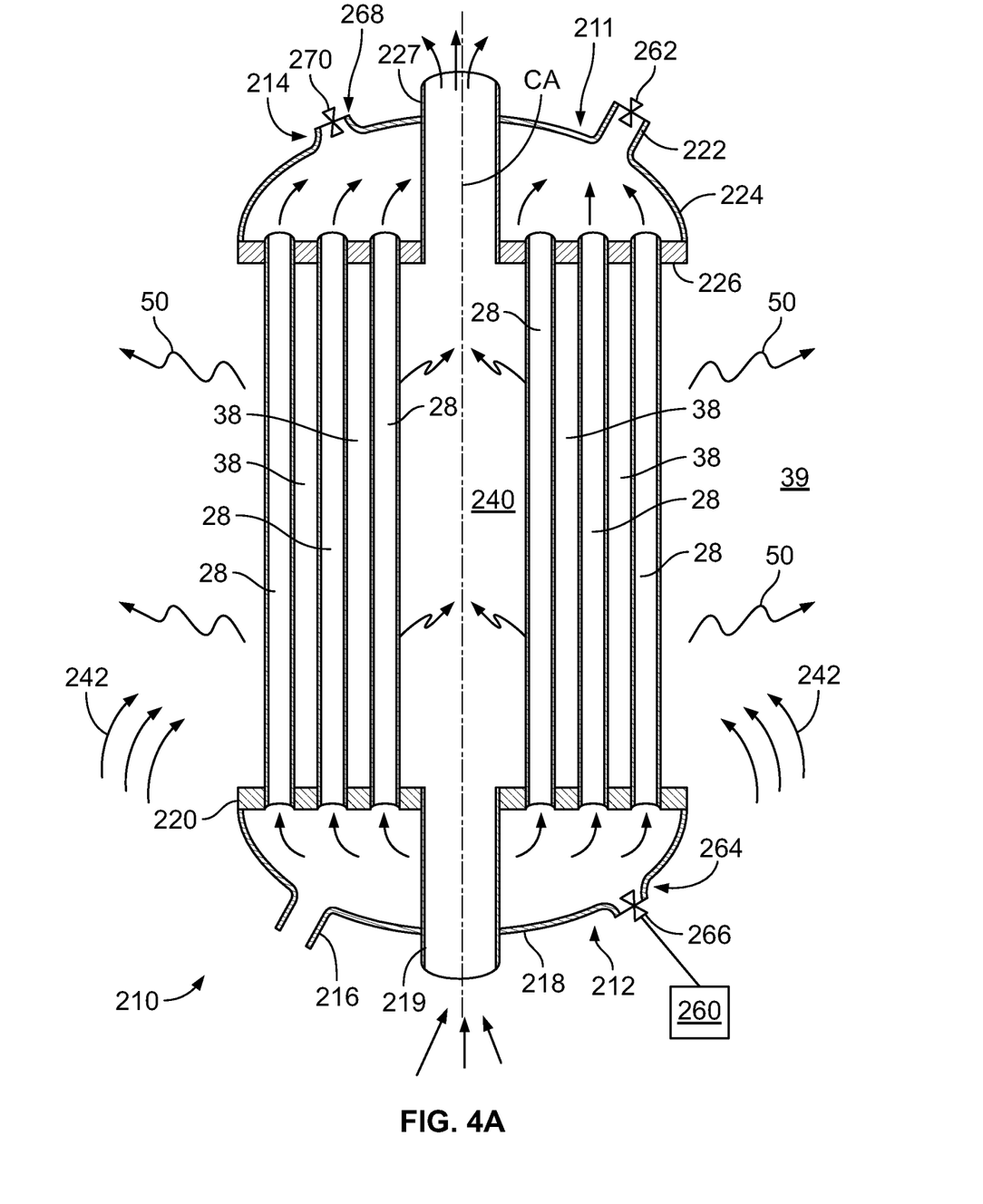
FIGS. 4a to 4c show a dry FCVS in accordance with another embodiment of the present invention.
Figure 4B:
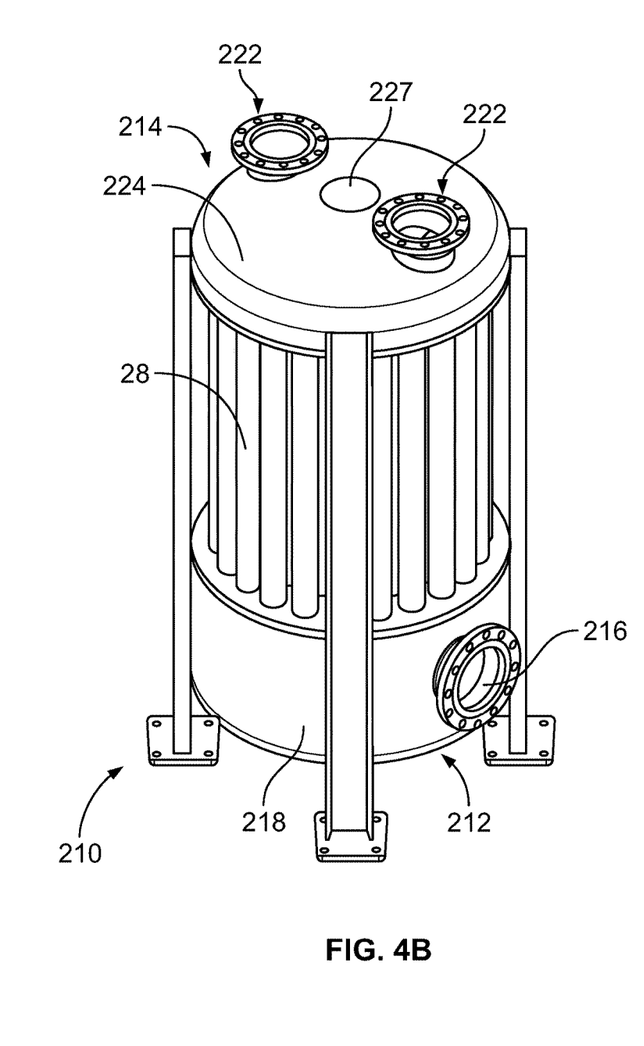
Figure 4C:
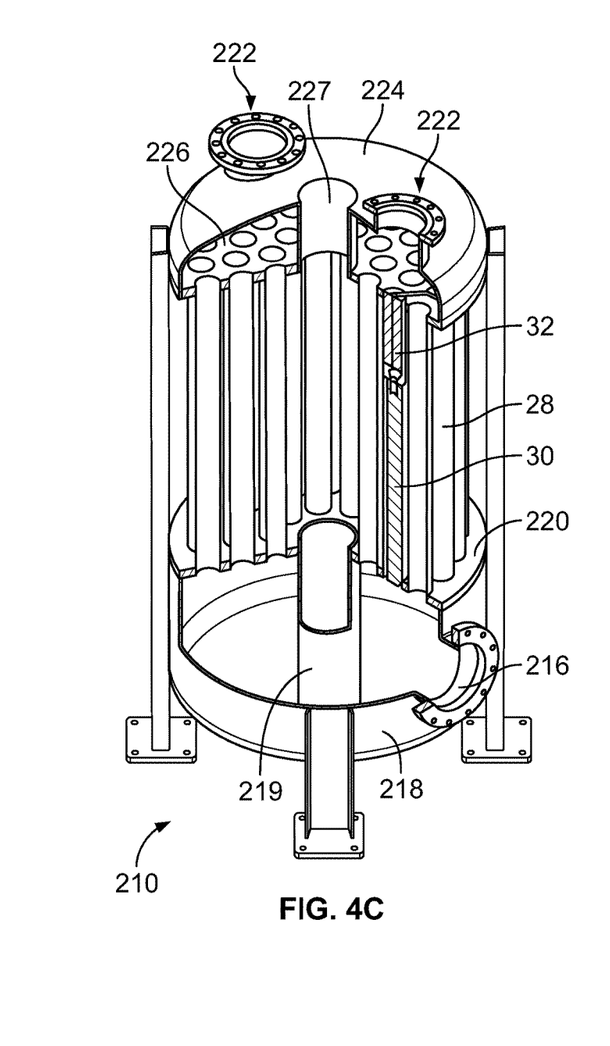

FIGS. 4a to 4c show a dry FCVS 210 in accordance with another embodiment of the present invention. FIG. 4a shows a cross-sectional view of FCVS 210, FIG. 4b shows a perspective view of FCVS 210 and FIG. 4c shows a cut-away perspective view of FCVS 210. FCVS 210 is formed in the same manner as FCVS 10, except that FCVS 210 is designed for internal tube nest cooling. More specifically, FCVS 210 includes a housing 211 having an inlet portion 212, an outlet portion 214 and pressure tubes 28. Inlet portion 212 includes an inlet tube or pipe 216 that expands into an annular manifold 218 holding an annular tubesheet 220 opposite inlet pipe 216. An inlet cooling tube 219 is imbedded in inlet portion 212 and passes through manifold 218 and tubesheet 220. Outlet portion 214 has a similar design, including an outlet tube or pipe 222 that expands into an annular manifold 224 holding an annular tubesheet 226 opposite inlet pipe 216. An outlet cooling tube 227, which forms an internal chimney, is imbedded in outlet portion 214 and passes through manifold 224 and tubesheet 226. Ambient air 39 enters into inlet cooling tube 219 and enters into an interior air space 240 formed within FCVS 210 along a center axis CA thereof. Ambient air flow 242 also enters radially toward center CA for convective removal of decay heat. The cooling air then passes out outlet cooling tube 227.

As shown in FIG. 4a, but omitted from FIGS. 4b and 4c, FCVS 210, similar to FCVS 10, also includes a schematically shown air source 260 for providing air to remove decay heat from MFF 30 when a flow of gas through outlet portion 214 is closed off, for example via a controllable valve 262 provided in outlet pipe 222. The air source 260 provides convective air flow through pressure tubes 28 to remove the decay heat of radioactive aerosols captured in MFF 30. Air source 260 may be connected to a cooling inlet port 264, which may be opened and closed by a controllable valve 266, formed in inlet portion 212 at manifold 218. Outlet portion 214 may also include a cooling outlet port 268, which may be opened and closed by a controllable valve 270, provided at manifold 224. When the outlet of outlet pipe 222 is closed by valve 262, ports 264, 268 may be opened by respective valves 266, 270 such that cooling air from air source 260 flows into inlet portion 212, through pressure tubes 28 and out of outlet portion 214 via cooling outlet port 268.

Figure 5A:
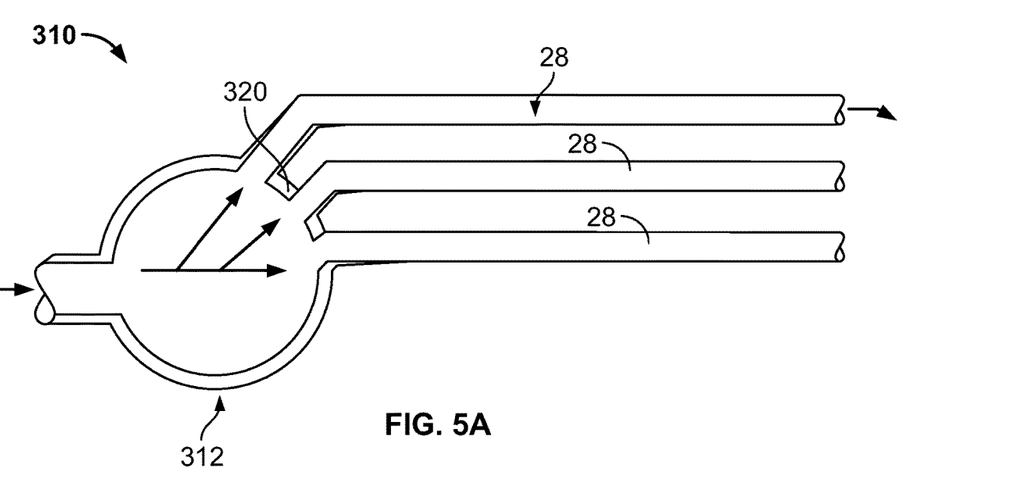
FIGS. 5a and 5b show a dry FCVS in accordance with another embodiment of the present invention.
Figure 5B:
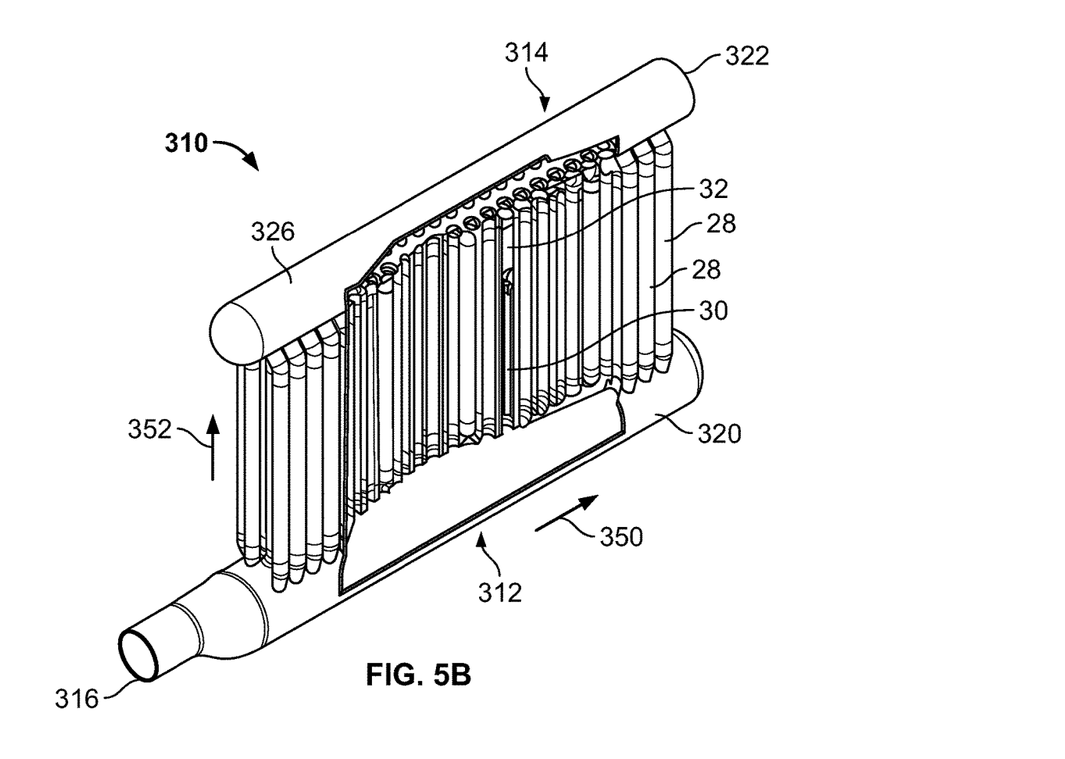

FIGS. 5a and 5b show a dry FCVS 310 according to another embodiment of the present invention. FIG. 5a shows a partial cross-sectional view of an inlet portion 312 of a dry FCVS 310 and FIG. 5b shows a perspective view of FCVS 310. Pressure tubes 28 may be arranged horizontally as shown in FIG. 5a or vertically as shown in FIG. 5b. In contrast to the FCVS 10, FCVS 310 includes an inlet header 320 at inlet portion 312 in place of tubesheet 20 and an outlet header 326 at outlet portion 314 in place of tubesheet 26. Headers 320, 326 are connected to respective inlet and outlet pipes 316, 322 and are cylindrically shaped. Pressure tubes 28 extend from one side of each header 320, 326 along substantially the entire length of headers 320, 326. Headers 320, 326 extend longitudinally in a direction 350 that is perpendicular to a direction 352 in which pressure tubes 28 extend longitudinally. Headers may also be used in place of a tubesheets in FCVS 10, 110 and 210 and the pressure tubes in such embodiment may also be arranged horizontally instead of vertically. Similar to FCVSs 10, 210, in a preferred embodiment, FCVS 310 is configured with additionally cooling ports, valves and an air source to provide convective air flow through pressure tubes 28 to remove decay heat from MFF 30 when a flow of gas through outlet portion 314 is closed off.

FCVSs 10, 110, 210, 310 are configured for use outside of a containment building, or in a containment innerspace, as discussed for example below with respect to FIGS. 7a, 7b. FCVSs 10, 110, 210, 310 may allow for lighter construction than other (wet or dry) pressure vessel designs, that may require two heavy pressure vessels—one for filter and one for sieve. FCVS 10, 110, 210, 310 may also allow for easier modularization, by adding more channels to get the required flow and/or making several groups of pressure tubes 28 per tubesheets and/or headers.

Figure 6A:
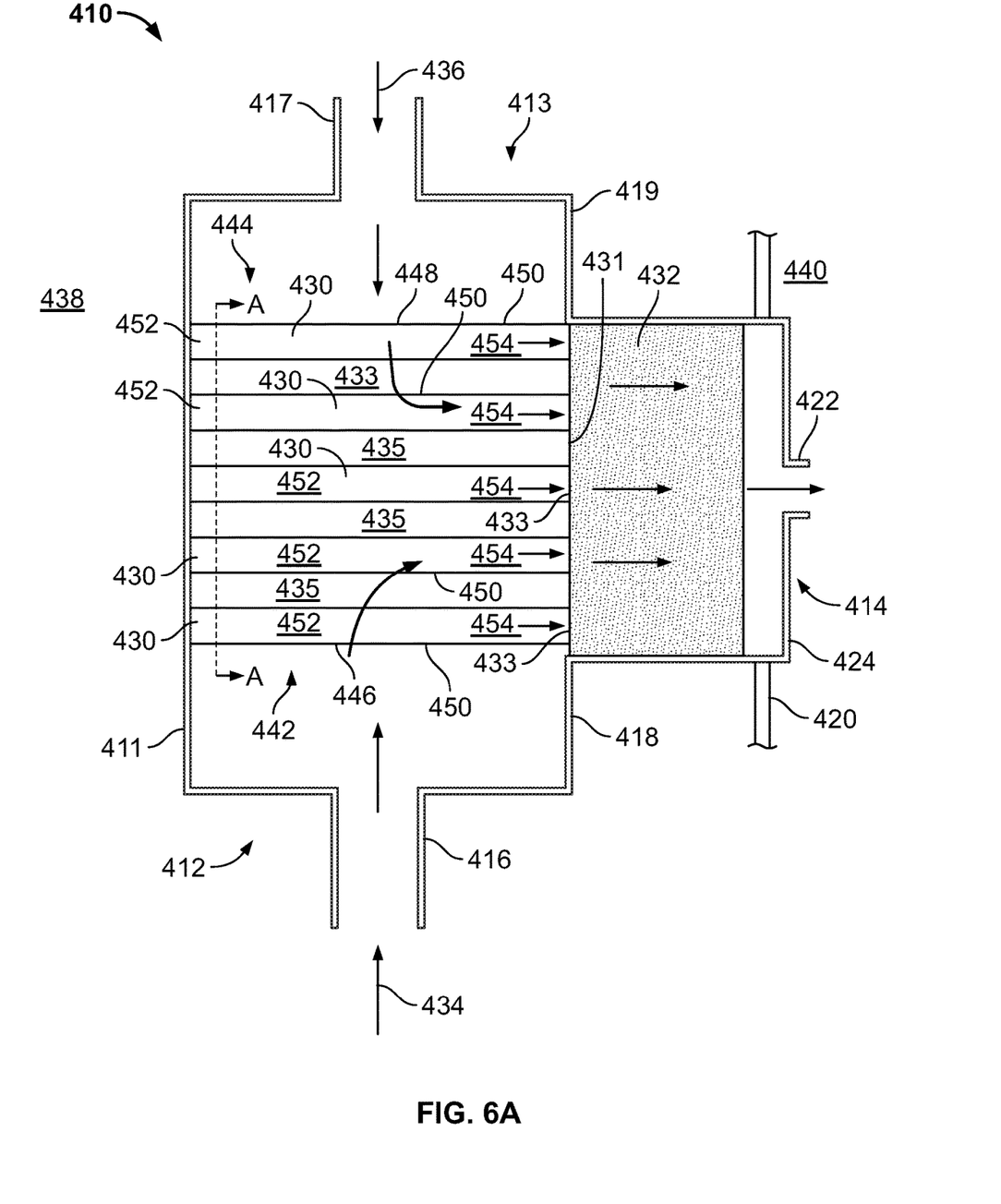
FIGS. 6a and 6b show cross-sectional side views of a dry FCVS in accordance with another embodiment of the present invention.
Figure 6B:
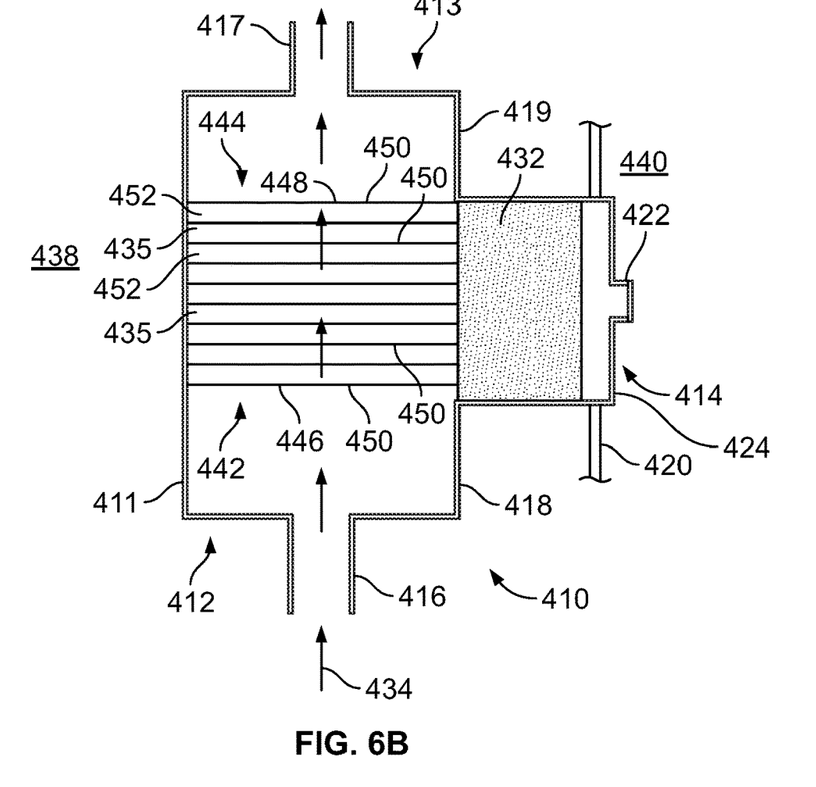
Figure 6C:
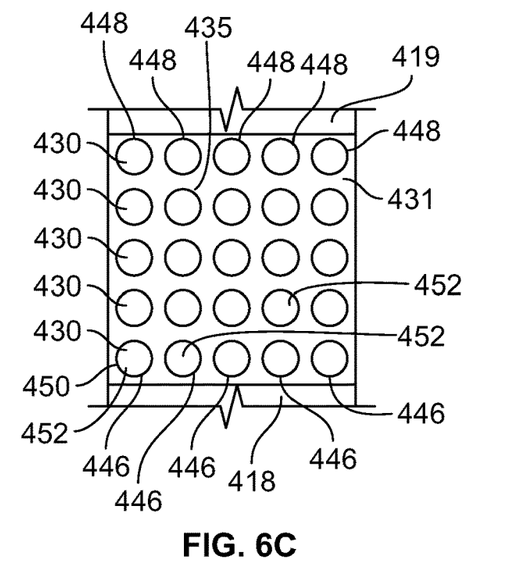

FIGS. 6a and 6b show cross-sectional view of a dry FCVS 410 in accordance with another embodiment of the present invention. FIG. 6c shows a cross-sectional view at A-A in FIG. 6a. Instead of utilizing the pressure tube design of FCVSs 10, 110, 210, 310, FCVS 410 has a chimney design for convective transfer of decay heat and is configured for use inside of a containment 420. FCVS 410 includes a dual inlet housing 411, which in this embodiment is formed of metal, having two inlet portions 412, 413 and an outlet portion 414. Lower inlet portion 412 includes an inlet tube or pipe 416 that expands into a manifold 418 and upper inlet portion 413 includes an inlet tube or pipe 417 that expands into a manifold 419. Inlet portion 412 is positioned vertically below outlet portion 413. Outlet portion 414 includes an outlet tube or pipe 422 arranged horizontally and for receiving aerosol and iodine filter gas from an outlet manifold 424 and exhausting gas out of containment 420. A plurality of round elongated aerosol filters in the form of longitudinally horizontally extending cylindrical MFFs 430 are arranged inside housing 411 vertically between inlets 412, 413, i.e., above lower inlet portion 412 and below upper inlet portion 413. An iodine filter in the form of a MS 432 is also arranged inside housing 411 horizontally between MFF 430 and outlet portion 414. In the exemplary embodiment shown in FIGS. 6a to 6c, as shown in FIG. 6c, FCVS 410 includes twenty-five MFFs 430 arranged in a five column, five row square arrangement in a spaced manner such that MFFs 430 are arranged distances from each other by space 435. In other embodiments, different numbers of MFFs 430 may be used and MFFs 430 may be arranged in different geometries.

A flow of gases through FCVS 410 during normal venting of containment 420 is illustrated in FIG. 6a. During the venting of containment 420, two contaminated inlet gas streams 434, 436 may enter into FCVS 410 at the same time, flow through MFFs 430 and MS 432 and then exit FCVS 410 outside of containment 420. A first inlet gas stream 434 flows upwardly into lower inlet portion 412 and a second inlet gas stream 436 flows downwardly into upper inlet portion 413. A higher temperature and pressure of ambient air 438 inside containment 420 compared to an ambient air 440 outside containment 420 causes inlet gas streams 434, 436 to enter into FCVS 410 and exit FCVS 410 at outlet portion 414 into air 440 outside of containment 420. Lower inlet portion 412 is arranged for directing contaminated gas stream 434 upward into a lower section 442 of MFFs 430 during the venting of containment 420 and upper inlet portion 413 is arranged for directing contaminated gas stream 436 downward into an upper section 444 of MFFs 430 during the venting of containment 420. Gas stream 434 flows upward through inlet pipe 416 into manifold 418 and through a lowermost or bottom surfaces 446 of MFFs 430 while gas stream 436 flows downward through inlet pipe 417 into manifold 419 and through an uppermost or top surfaces 448 of MFFs 430.

Contaminated gas entering into MFFs 430 passes through cylindrical outer surfaces 450 of MFFs 430. Filter 450 remove aerosol particles from the contaminated gas stream and define channels 452 therein for the flow of aerosol filtered gas 454. The aerosol filtered gas 454 then flows longitudinally with respect to channels 452 and horizontally out of channels 452 into the directly adjacent MS 432. At longitudinal ends 433 of MFFs 430 adjacent to MS 432, MFFs 430 are embedded in a tubesheet 431 that limits the airflow into MS 432 to the aerosol filtered gas 454. The aerosol filtered gas flowing horizontally through MS 432 is iodine filtered and then flows horizontally through manifold 424 and outlet pipe 422 to join ambient air 440 outside of containment 420.

FIG. 6b illustrates a flow of gases through FCVS 410 when FCVS 410 is not venting, i.e., when a flow of gas through outlet portion 414 is closed off. When FCVS 410 is not venting, the pressure difference between ambient air 438 and ambient air 440 is not present and gas is not sucked downward through inlet portion 413 into housing 411. However, due to the temperature difference between inlet portion 412 and inlet portion 413, gas stream 434 enters inlet portion 412, passes through spaces 435 between MFFs 430 and exits inlet portion 413. Gas stream 434 enters upwardly between MFFs 430 at lower section 442 and out of upper section 444. More specifically, gas stream 434 enters upwardly into inlet pipe 416, through manifold 418 and past lower surfaces 446 of MFFs 430, then through spaces 435 between MFFs 430 and past of upper surfaces 448, into manifold 419 and out of outlet pipe 417. Lower inlet portion 412 and upper inlet portion 413 are accordingly arranged such gas flows in through lower inlet portion 412 upward past the lower and upper sections 442, 444 of MFF 430 and out through upper inlet portion 413 when a flow of gas through outlet portion 414 is closed off so as to allow a forced convective cooling of the decay heat of aerosols captured in MFF 430.

FCVS 410 is arranged and configured such that when a flow of gas through outlet portion 14 is closed off convective and radiant heat transfer removes decay heat of aerosols captured in MFFs 430. Convective heat transfer occurs via the outer surface of MFFs 430 and air passing upward via the chimney effect through housing 411 and radiant heat transfer occurs between MFFs 30 and housing 411.

FCVS 410 addresses over-pressurization of containment 420 in the event of a severe accident by using one or more MFFs 430 and MS 432 in dual-inlet housing 411, which allows for two inlet paths during venting, but creates a natural convective heat transfer path when not venting to remove decay heat due to the chimney effect of the dual-inlets. Dual-inlet housing 411 creates a chimney effect with one inlet higher than the other, so that during non-venting periods, the containment atmosphere actually cools the decay heat via convective heat transfer with significant capability to handle large heat loads to address all types of Reactor designs. The convective design of FCVS 410 allows for passive decay heat removal, with no requirement to add water or chemicals. FCVS 410 may handle removal of the high decay heat load of multi-unit CANDUs and BWR and PWR Nuclear Power Plants.

Dual inlet housing 411 can also be installed inside containment 420 allowing for a non-pressure vessel enclosure which keeps the entire radioactivity inside containment 420 and eliminates any need for any external building. In an alternative embodiment, with two containment penetrations at different elevations and utilizing a pressure vessel design, FCVS 410 can also be installed exterior to containment 420.

In preferred embodiments, commercially available cartridge MFFs, for example SINTERFLO sintered stainless steel filter cartridges from Porvair Filtration Group, and commercially available MS media are used in FCVS 410 to allow for a lower cost for the filtering hardware.

The convective decay heat removal capability of FCVS 410 allows the ability to keep temperature below the auto-ignite temperature of hydrogen and also below the melting point of hydroscopic aerosols by designing the chimney effect within the temperature restrictions. Since the heat transfer is convective, then aerosol fouling related to radiant heat transfer emissivity that limits the effectiveness of other dry FCVS technologies is not an issue for FCVS 410.

Figure 7A:
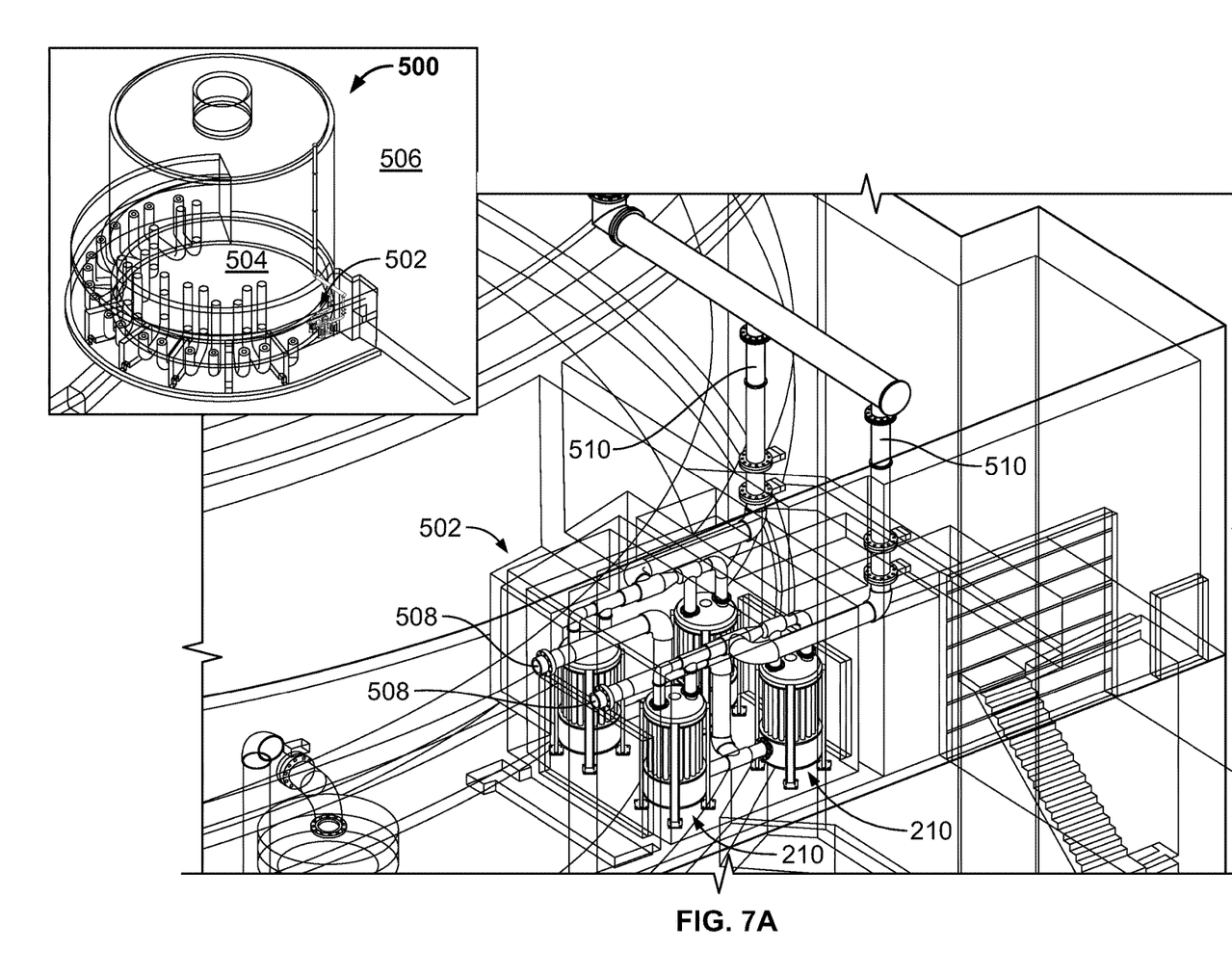
FIGS. 7a and 7b show an example of a nuclear reactor containment to illustrate the placements of FCVSs according to embodiments of the present invention.
Figure 7B:
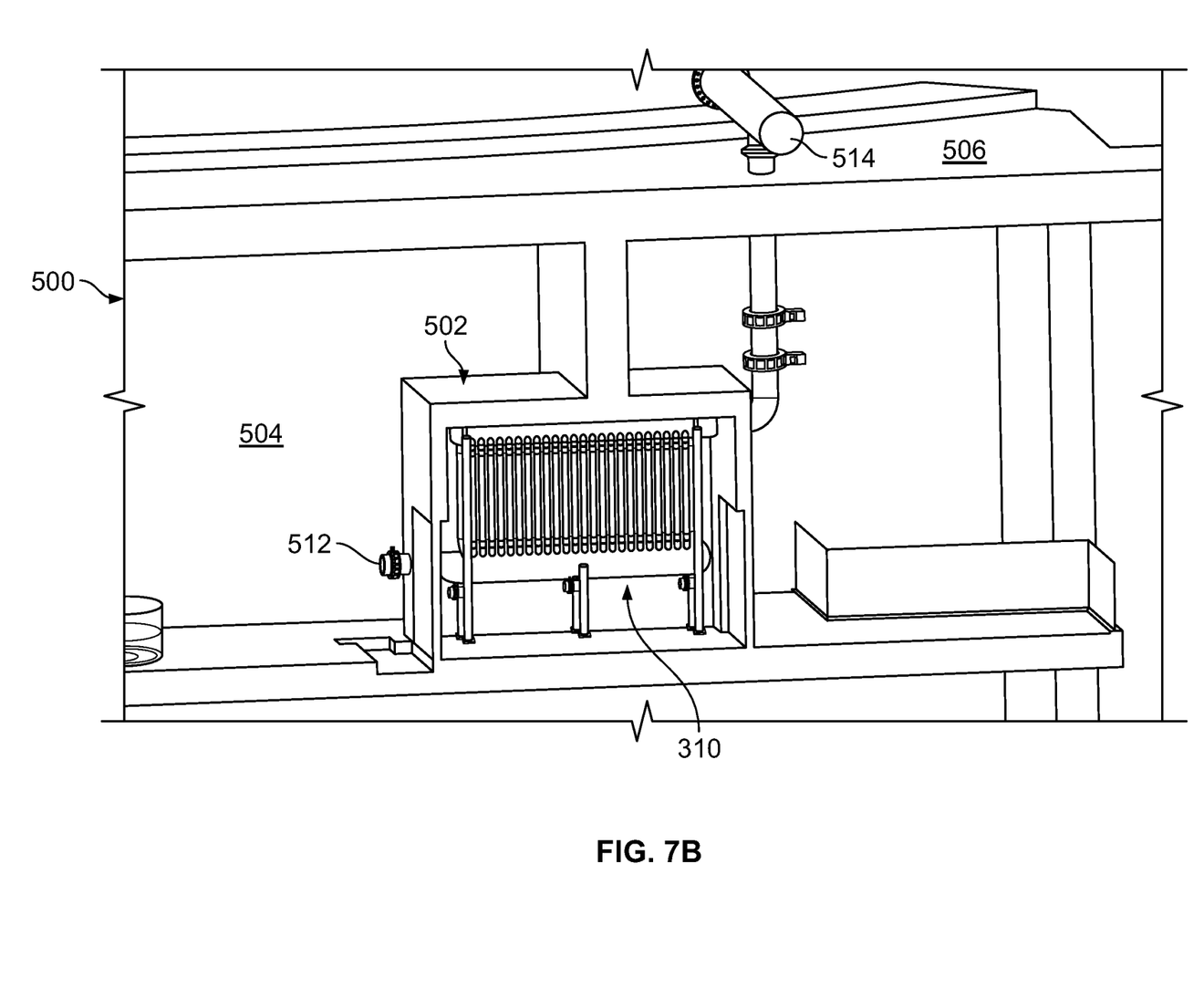

FIGS. 7a and 7b show an example of a nuclear reactor containment 500 to illustrate the placements of FCVSs 210 and 310. In these embodiments, nuclear reactor containment 500 includes an innerspace 502 that is sealed off from inside 504 of containment 500 and outside 506 of containment 500. In the embodiment shown in FIG. 7a, innerspace 502 includes four FCVSs 210. Inlets 508 of FCVSs 210 are connected to inside 504 of containment and outlets 510 of FCVSs 210 are connected to outside 506 of containment. In the embodiment shown in FIG. 7b, one FCVS 310 is shown in innerspace 502, with an inlet 512 connected to inside 504 of containment and an outlet 514 of FCVS 310 connected to outside 506 of containment 500.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A dry filtered containment venting system for a nuclear reactor containment comprising:
   a housing; and
   a plurality of round and/or elongated aerosol filters inside the housing for removing contaminant aerosols from gas passing through the housing during venting of the containment,
   the housing including at least one inlet portion configured for directing gas into the plurality of aerosol filters during the venting of the containment and an outlet portion for gas filtered by the plurality of aerosol filters during the venting of the containment,
   the at least one inlet portion being arranged with respect to the plurality of aerosol filters such that, when a flow of gas through the outlet portion is closed off, gas flows through the at least one inlet portion to remove decay heat of the aerosols captured in the plurality of aerosol filters by at least one of convective, radiant and conductive heat transfer.

2. The dry filtered containment venting system as recited in claim 1 wherein the at least one inlet portion includes an inlet pipe and an inlet tubesheet, the outlet portion including an outlet pipe and an outlet tubesheet, the dry filtered containment venting system further comprising a plurality of tubes extending between the inlet tubesheet and the outlet tubesheet, each of the plurality of tubes including at least one of the aerosol filters positioned therein to capture contaminants within an airflow passing through the system.

3. The dry filtered containment venting system as recited in claim 2 wherein each of the plurality of tubes further includes a sieve positioned therein to capture contaminants within an airflow passing through the system.

4. The dry filtered containment venting system as recited in claim 2 wherein the plurality of tubes have a nominal diameter of approximately ten inches to approximately two inches.

5. The dry filtered containment venting system as recited in claim 2 wherein in at least one of the plurality of tubes, the aerosol filter is positioned in a spaced relationship with respect to the at least one tube, such that a gap is formed between an outer surface of the filter and an inner surface of the at least one tube and that the relative surface area of cold surface to hot surfaces for heat transfer is greater than 1.

6. The dry filter containment venting system as recited in claim 2 further comprising an iodine filter arranged between at least one of the aerosol filters and the outlet portion in a gas flow direction.

7. The dry filtered containment venting system as recited in claim 1 wherein the at least one inlet portion includes an inlet pipe and an inlet header, the outlet portion including an outlet pipe and an outlet header, the dry filtered containment venting system further comprising a plurality of tubes extending between the inlet header and the outlet header, each of the plurality of tubes including at least one of the aerosol filters positioned therein to capture contaminants within an airflow passing through the system.

8. The dry filtered containment venting system as recited in claim 7 wherein each of the plurality of tubes further includes a sieve positioned therein to capture contaminants within an airflow passing through the system.

9. The dry filtered containment venting system as recited in claim 7 wherein the plurality of tubes have a nominal diameter of approximately ten inches to approximately two inches.

10. The dry filtered containment venting system as recited in claim 7 wherein in at least one of the plurality of tubes, the filter is positioned in a spaced relationship with respect to the at least one tube, such that a gap is formed between an outer surface of the filter and an inner surface of the at least one tube and that the relative surface area of cold surface to hot surfaces for heat transfer is greater than 1.

11. The dry filtered containment venting system as recited in claim 1 wherein the at least one inlet portion includes:
    a lower inlet portion; and
    an upper inlet portion,
    the lower inlet portion arranged for directing gas upward into a lower section of the aerosol filters during the venting of the containment,
    the upper inlet portion arranged for directing gas downward into an upper section of the aerosol filters during the venting of the containment,
    the lower inlet portion and the upper inlet portion being arranged such that gas flows in through the lower inlet portion upward past the lower and upper sections of the aerosol filter and out past the upper inlet portion when a flow of gas through the outlet portion is closed off so as to allow a forced convective cooling of the decay heat of aerosols captured in the aerosol filters.

12. The dry filter containment venting system as recited in claim 11 wherein the aerosol filters each define a horizontally extending channel therein.

13. The dry filter containment venting system as recited in claim 12 wherein the aerosol filters are arranged with respect to the lower and upper inlet portions such that during venting of the containment gas streams enter both the lower and upper inlet portions and flow into the aerosol filters into the channels and then horizontally out of the outlet portion.

14. The dry filter containment venting system as recited in claim 13 further comprising an iodine filter horizontally between the aerosol filters and the outlet portion, the gas flowing into the channels passing through the iodine filter before flowing horizontally out of the outlet portion.

15. The dry filter containment venting system as recited in claim 14 wherein the iodine filter is a molecular sieve.

16. The dry filter containment venting system as recited in claim 14 wherein the lower inlet portion, the upper inlet portion and the at least one outlet portion are integral with the housing and form an integral structure configured for mounting in a wall of the nuclear reactor containment such that the lower inlet portion and the upper inlet portion are inside the containment and the least one outlet portion directs filtered gas out of the containment.

17. The dry filter containment venting system as recited in claim 12 wherein the aerosol filters are arranged with respect to the lower and upper inlet portions such that when a flow of gas through the outlet portion is closed off a gas stream enters the lower inlet portion and flows past the aerosol filters and upwardly out of the upper inlet portion.

18. The dry filter containment venting system as recited in claim 1 wherein the aerosol filters are round metal fiber filters.

19. The dry filter containment venting system as recited in claim 1 wherein the plurality of aerosol filters are each elongated and extend longitudinally between a longitudinal inlet end and a longitudinal outlet end, the plurality of aerosol filters being arranged such that gas filtered by the aerosol filters flows out the longitudinal outlet end of each of the aerosol filters and out the outlet portion when the outlet portion is open.

\* \* \* \* \*